United States Patent [19]

Janotik et al.

[11] 4,414,733

[45] Nov. 15, 1983

[54] MACHINE TOOL INSERT DISPENSER

[75] Inventors: Adam M. Janotik, Grosse Ile; Lawrence P. Kazyak, Northville, both of Mich.

[73] Assignee: Ford Motor Company, Dearborn, Mich.

[21] Appl. No.: 265,744

[22] Filed: May 21, 1981

[51] Int. Cl.³ .............................................. B23Q 3/155
[52] U.S. Cl. ...................................... 29/568; 82/36 A
[58] Field of Search ................. 29/568, 26 A; 408/35; 82/36 A, 36 B; 414/226; 221/81

[56] References Cited

U.S. PATENT DOCUMENTS

| 3,355,797 | 12/1967 | Lohneis | 29/568 |
| 3,368,265 | 2/1968 | Kirkham | 29/568 |
| 3,406,607 | 10/1968 | Hill | 408/35 X |
| 3,793,708 | 2/1974 | Watanabe et al. | 29/568 |
| 4,218,816 | 8/1980 | Dormehl | 29/568 |
| 4,288,192 | 9/1981 | Geiger et al. | 29/568 X |

FOREIGN PATENT DOCUMENTS 2630857 1/1978 Fed. Rep. of Germany ...... 414/226

Primary Examiner—Z. R. Bilinsky
Attorney, Agent, or Firm—D. J. Harrington; F. G. McKenzie

[57] ABSTRACT

A rotary magazine holds cutting tool inserts, each having multiple cutting edges. The magazine is rotated to a first station where the inserts are removed, transferred to a machine tool and returned after use. Each unused cutting edge of the inserts is successively advanced to a reference position on the magazine. A pneumatically operated device lifts the inserts from the magazine and rotates them into position for machining. A pneumatically operated gearwheel advances the position of the cutting edges with respect to the reference position.

8 Claims, 7 Drawing Figures

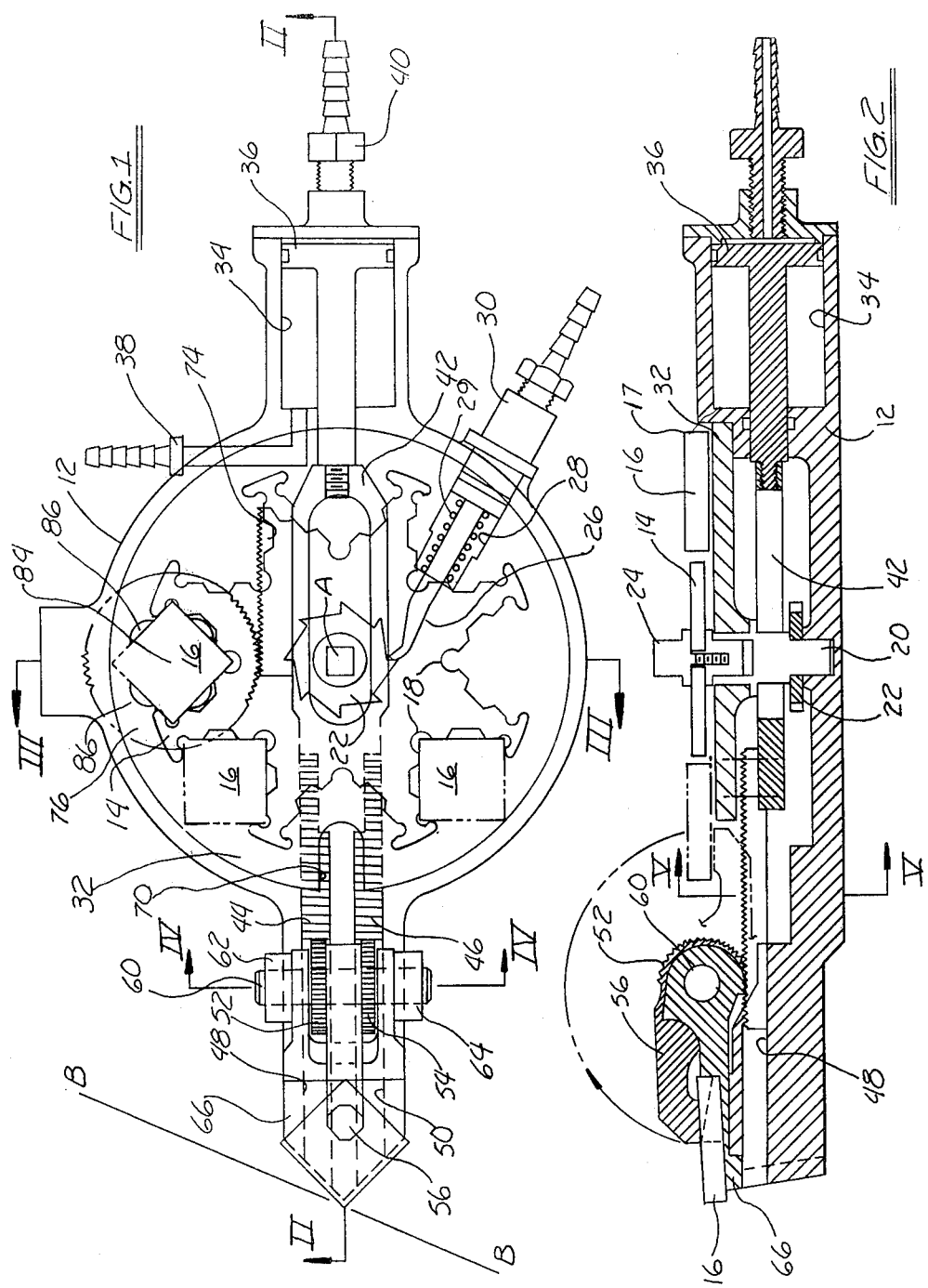

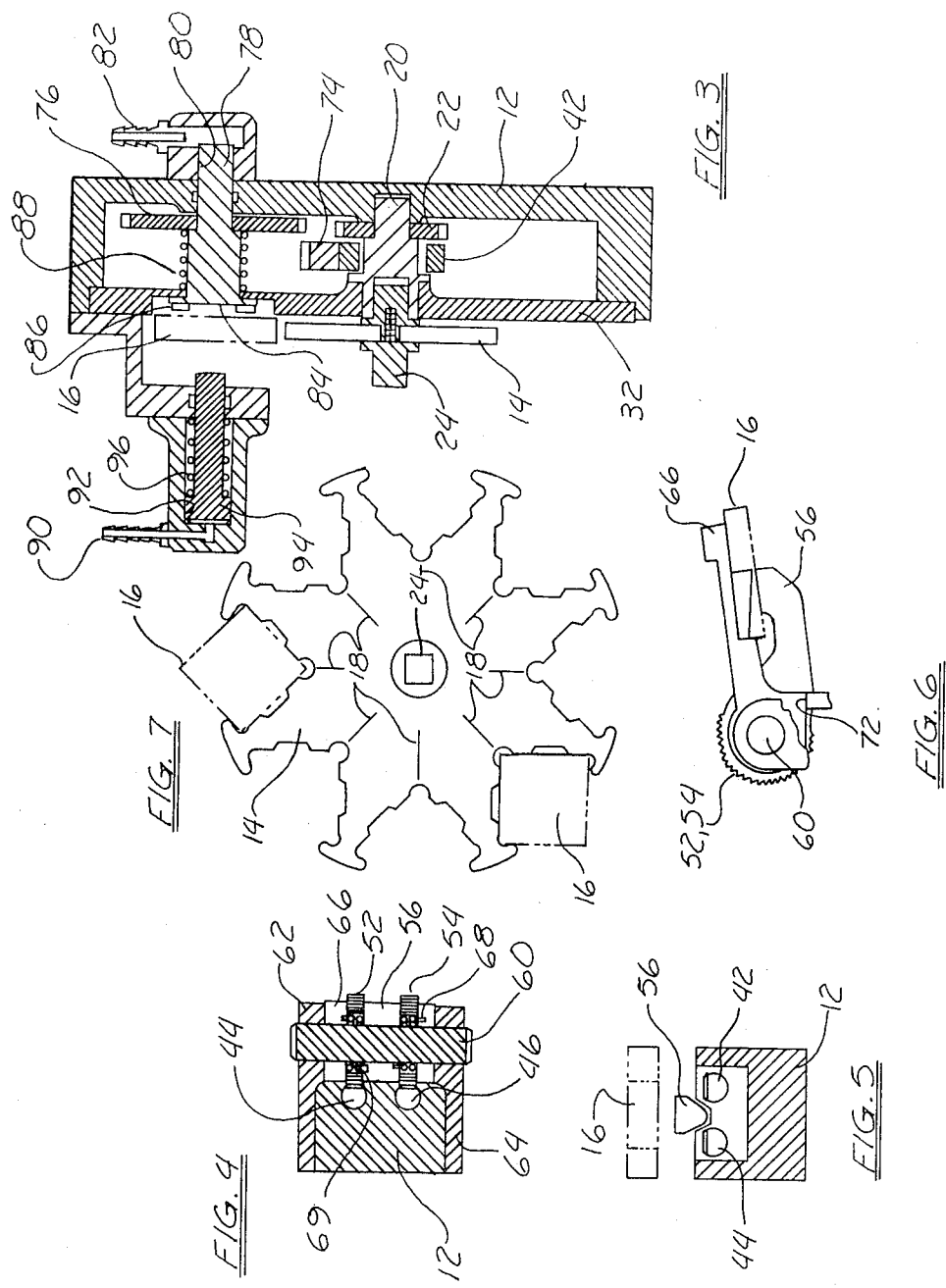

MACHINE TOOL INSERT DISPENSER

BACKGROUND OF THE INVENTION

1. Field of the Invention

The present invention relates to a device for supplying cutting tools to a machine tool and for removing the cutting tools after use. More particularly, the invention pertains to a system for automatically supplying cutting tools from a magazine and for returning used tools to the magazine in an ordered arrangement whereby each cutting edge may be supplied sequentially for machining.

2. Description of the Prior Art

Numerically controlled machine tools generally are provided with some means for automatically supplying cutting tools for the machining operation. Frequently, the machine is equipped with some means for sensing when the cutting tools become too dull to machine effectively. Devices for automatically replacing the cutting tools have required excessive time to bring the replacement into position on the tool and to fasten the tool at a fixed position for machining.

Frequently, a complicated mechanism is required to carry the replacement cutting tool inserts from a storage device to the machine tool. The time required to install a cutting tool has required an excessive idle time causing the machine tool to be operated at less than its potential efficiency.

Modern ceramic cutting tools capable of machining at extremely high rates of speed are smaller and lighter compared to conventional carbide cutting tools. The ceramic tools may have many cutting surfaces formed on a single tool insert whose size may approximate one square inch. These tool inserts may be in the form of a parallelepiped providing a first set of cutting edges on the upper surface at each corner and the second set on the lower surfaces.

U.S. Pat. No. 3,793,708 describes an automatic cutting tip replacement device for releasably clamping a cutting tool on the tool holder of a machine tool only the cutting blade may be replaced rather than the entire tool. Spare cutting bladed are housed in a cassette used cutting bladed are stored in another cassette and a cutting tip replacement apparatus moves between replacing and awaiting position.

Another example of a machine tool that is supplied with cutting tools from a storage device is described in U.S. Pat. No. 4,218,816. In this example, the machine tool includes a turret for receiving tools and a drum magazine for storing additional tools. The tools are automatically carried to a working position on the turret from the magazine.

SUMMARY OF THE INVENTION

It is a principal object of the present invention to supply a machine tool with cutting tool inserts from a device that dispenses replacable inserts and fixes them in position on the tool during machining. It is another object to supply the cutting tool inserts to the machine tool in an orderly pattern so that the several cutting edges of each tool insert are sequentially used during machining. It is a further object that the cutting tool inserts have their cutting edges advanced in position on a storage magazine so that upon removal from the magazine and delivery to the machine tool an unused cutting edge is presented for machining. It is an object of this invention that the device automatically dispenses the cutting inserts to the machine tool during a process cycle that allows each of the multiple cutting edges of each tool insert to be used without the need for control by the machine operator. Another object of this invention is to automatically remove worn or damaged cutting tool inserts from the machine tool and return them to the magazine where they are advanced in position bringing a new cutting edge into position for transfer to the machine tool.

The automatic cutting tool replacement dispenser according to this invention includes a rotatably mounted magazine that carries multiple cutting tool inserts at specific locations on the magazine that are spaced angularly about the axis of rotation. The cutting tools are arranged in the magazine locations such that each of their cutting edges has a fixed position with respect to a reference position. The magazine is rotated incrementally through an angular distance that corresponds to the distance between insert locations by means of a pneumatically pressurized cylinder that causes a pawl to advance a ratchet wheel. In this way the magazine carries each insert to a first station where it is removed from the magazine and transferred by a gripping device to the tool for machining. The gripping and transfer device is actuated by a pneumatic cylinder that rotates a clamp arm and a plate that grips the insert while it is in the magazine, lifts it from the magazine and carries it to the machine tool.

After use in machining, the worn insert is replaced on the magazine in the position it had before machining. The magazine is advanced to a second station where that insert is automatically removed and rotated with respect to its reference position, thereby bringing an unused cutting edge of the insert to the reference position. At the first station another insert is removed from the magazine and installed in the machine tool. The magazine cycle continues until all the cutting edges of each insert on the one planar surface have been used. Preferably, the cutting edges on one planar surface of the inserts will be sufficient in number for the requirements of the machine tool during one workshift. In any case, after the cutting edges on one planar surface of the inserts are consumed a new set of cutting edges is made available for machining by simply inverting the magazine thereby bringing the cutting edges on the second planar surface into position for use.

DESCRIPTION OF THE DRAWINGS

FIG. 1 is a top view of a device for automatically supplying cutting tool inserts to a machine tool.

FIG. 2 is a cross section taken at plane II—II of FIG. 1.

FIG. 3 is a cross section of the device of FIG. 1 taken at plane III—III showing in elevation an pneumatically operated mechanism for advancing inserts in position on the magazine.

FIG. 4 is a cross section taken at plane IV—IV through the centerline of the hinge pin about which the insert clamp pivots.

FIG. 5 is a cross section taken at plane V—V showing the lower arm of the insert clamp assembly in position to lift a tool insert from the magazine.

FIG. 6 is a partial front elevation view of the insert clamp assembly in position to lift a tool insert from the magazine.

FIG. 7 is a top view of the tool magazine.

DESCRIPTION OF THE PREFERRED EMBODIMENT

The top view of the cutting tool insert supply device shown in FIG. 1 includes a drum casing 12 having a central axis A—A about which a magazine 14 rotates. The magazine carries cutting tool inserts 16, which in this case are square but could be triangular or another shape that provides multiple cutting corners. Preferably, the corners are present both on the upper surface and the lower surface of each insert. The inserts are located on the magazine at angularly spaced locations that are distributed around the axis A, one insert at each location though some are not shown in FIG. 1 for reasons of clarity. Each insert location on the magazine has a reference position 18, which in this case is the position of the radially innermost cutting corner of the insert on the magazine location. It is the cutting corner at the reference position that is used next in the machining process.

Mounted coaxially with axis A is a drive spindle 20 having a ratchet wheel 22 keyed thereon and providing a square hole at its upper end within which the lower half of a square stub shaft portion of the magazine hub 24 is driveably engaged. The upper and lower halfs of the magazine hub 24 are joined by screw threads. The teeth of the ratchet wheel 22 are engaged by a retractable pawl 26 that is fixed to the end of or integrally formed with a piston moving in a cylinder 28 which is formed in the casing 12. The line of action of the pawl is tangential to the ratchet wheel. A pneumatic fitting 30 secured to the end of the cylinder admits pressurized air to the cylinder to advance the pawl into driving engagement with the teeth of the ratchet wheel. A compression spring biases the piston to a retracted position within the cylinder and in this way disengages the pawl from the teeth of the ratchet wheel when the cylinder is depressurized. In this way, the magazine rotates clockwise, when viewed from above as in FIG. 1, when the cylinder 28 is pressurized. Each time the cylinder is pressurized the magazine rotates about axis A through an angle that is equal to the angular distance between cutting tool insert locations. For this reason, the number of teeth on the ratchet wheel is equal to the number of cutting tool insert locations on the magazine.

The top of the casing 12 is closed by a removable cover 32, which is shown only in part in FIG. 1 in order to more clearly show the structure that lies beneath the cover. Formed integrally with the casing 12 and extending radially outward from axis A is a second cylinder 34 having a double action piston 36 working within the cylinder as the cylinder is pressurized from opposite ends with compressed air admitted by way of fittings 38 and 40.

The end of the piston rod is threaded onto the end of a yoke 42 whose parallel and radially directed arms straddle the magazine spindle 20 as the piston 36 works within the cylinder. The opposite end of yoke 42 has toothed racks 44 and 46 attached thereto. The outer end of the racks move within guide channels 48, 50 formed in the casing 12. Racks 44 and 46 are continuously engaged with toothed wheels 52, 54, respectively, formed integrally with a clamp arm 56. The clamp arm is secured to a pin 60 that is supported within the holes formed in lugs 62, 64 that are attached to the casing. Journalled on pin 60 is a clamp plate 66 which provides a pocket recess for retaining a cutting tool insert 16 in position during machining of the workpiece. Light torsion springs 68, 69 are provided as shown in FIG. 4 whereby rotation of clamp arm 56 causes clamp plate 66 to follow the arm in rotation about the axis of pin 60. A surface of the clamp arm 56 abuts the upper surface of the cutting insert and retains the insert in position on the clamp plate 66 during machining.

Piston 36 moves to the end of cylinder 34 when compressed air is applied through fitting 40 and the cylinder is depressurized through fitting 38. Then, clamp arm 56 rotates clockwise when viewed as in FIGS. 2 and 6 on pin 60 and the torsional springs 68, 69 cause clamp plate 66 to follow. The clamp arm is shown at the opposite end of its rotational travel in phantom in FIG. 2. In this position, clamp arm 56 is received within a recess 70 formed in the casing cover 32 so that the surface that contacts the cutting insert is below the lower plane of the insert. The casing 12 provides a stop surface 72 that limits the amount of rotation of the clamp plate 66 such that contact is made between surface 72 and the clamp plate before piston 36 has moved to the full range of its travel within cylinder 34. Therefore, after clamp plate 66 has bottomed, further movement of piston 36 operates to bring clamp arm 56 to the position shown in FIG. 2, but plate 66 is stopped at its position shown in FIG. 2. In this way the space between the gripping surfaces of the clamp plate and arm is greater than the thickness of the tool insert to be received therein. This widening of the space between the clamps operates to increase the force of the spring 68 tending to close the clamp surfaces, but assures that the insert carried by the magazine to the clamp will fit between arm 56 and plate 66.

The tool insert changer provides means for sequentially advancing the position of the cutting corners of each insert with respect to the reference position 18 of each insert location on the magazine. The device for accomplishing this function is shown best in FIGS. 1 and 3. Yoke 42 has a tooth rack 74 fixed on one of its arms in position to be engaged by the teeth of a gear wheel 76. Gear 76 is fixed to a piston 78 that moves within a cylinder 80 formed within a fitting 82 through which compressed air from an outside source may be admitted. At the opposite end of piston 78 and formed integrally with the piston is a flat plate surface 84 on which the tool inserts may be seated. At the corner of plate surface 84 are tabs extending outwardly therefrom between which the edges of the insert may be fitted and secured in place.

When cylinder 80 is pressurized, gear 76 is brought into engagement with rack 74 and the insert 16 is removed from its position on the magazine as a result of axial displacement of the piston 78. A coiled spring 88 biases piston 78 to the position shown in FIG. 3 when cylinder 80 is depressurized. Above the magazine is a compressed air fitting 90 having a cylinder 92 and a piston 94 operating within the cylinder. A spring 96 returns piston 94 to the top of the cylinder when it is depressurized. When cylinder 92 is pressurized, however, piston 94 moves into contact with the upper surface of the tool insert 16 and presses the insert into position on the magazine provided cylinder 80 is depressurized.

A cyle of operation begins with new cutting tools in position at each of the eight magazine locations and the magazine being located as in FIG. 1. Piston 36 is located at the extreme left end of cylinder 34 and the clamps 56, 66 are in position as illustrated in FIG. 6. Pistons 78 and 94 are not pressurized and are in the position shown in FIG. 3. Cylinder 28 is not pressurized.

First, the tool insert elevating cylinder 80 is pressurized through fitting 82 causing piston 78 to move upward thereby bringing gear 76 into engagement with rack 74. As this occurs, the tool insert that is located above piston 78 is removed from the magazine and placed on surface 84 between the tabs 86. Piston 78 moves sufficiently far to lift that insert entirely above the inner surface of the magazine 14 and cylinder 80 remains pressurized.

Next, cylinder 34 is pressurized through fitting 38 causing piston 36 to move to the right-hand end of the cylinder. This action causes the clamp members 56 and 66 to grasp the tool insert located on the magazine and to rotate counterclockwise about the axis of pin 60 until clamp plate 66 rests on the upper surface of the casing 12 in the position shown best in FIG. 2. In this position the tool insert can be used for machining a workpiece that may be rotated by the spindle of a lathe, for example, along an axis that parallels axis B—B. As a result of the movement of piston 36 from the left end to the right-hand end of cylinder 34, gear 76 is rotated counterclockwise when viewed as in FIG. 1 and the tool insert in position on surface 84 is rotated counterclockwise ninety degrees, thereby advancing another of its cutting edges into alignment with the reference position 18 on the magazine. Thereafter, cylinder 80 is depressurized allowing the insert to be transferred from surface 84 onto the magazine and gear 76 to be disengaged from rack 74. When piston 94 is energized it applies a force to the upper surface of the insert that acts to move insert 16 into position on the magazine. After the insert is returned to the magazine, cylinder 92 is depressurized. Machining of the workpiece can begin as soon as the tool insert is placed by the clamps in position for machining.

When the cutting edge of the insert has become dull from use in machining, the main air cylinder 34 is pressurized through fitting 40 causing clamps 56, 66 to rotate clockwise about pin 60 to the position shown in phantom in FIG. 2. This action returns the insert having the used cutting edge back to its former position on the magazine. Clamps 56 and 66 are then located as shown in FIG. 6. Next, cylinder 28 is pressurized causing pawl 26 to advance the ratchet wheel and with it the magazine through an angular distance equal to the spacing of the inserts about axis A. This action brings the next insert into position for removal from the magazine, that insert having a fresh cutting edge at its reference position 18. Cylinder 28 is depressurized and spring 29 acts to disengage the pawl from the ratchet tooth that was used to advance the magazine into a position of engagement with the succeeding ratchet tooth.

Successive cycles of operation cause the used cutting edge of the insert to be replaced on the magazine at the reference position. Thereafter, when the magazine has been advanced to the position of gearwheel 76, the insert is removed from the magazine, rotated ninety degrees and returned to the magazine with an unused cutting surface at the reference position 18. When that insert has been advanced sequentially to the angular station at which machining is done, it is again removed from the magazine, rotated about pin 60 into position for machining. In the embodiment illustrated, eight cutting tool inserts, each having four cutting edges, provide thirty-two surfaces for use by the machine tool. After these cutting surfaces are used, the magazine may be inverted and the entire cycle repeated until the second thirty-two cutting edges have been used for machining.

The cutting tool inserts need not be square but could have any suitable shape, for example triangular or diamond shape. The magazine would provide insert locations that closely match the contour of the inserts. The gear ratio produced by the engagement of gear 76 with rack 74 would be altered accordingly so that one stroke of piston 36 would operate to rotate the insert that is in position on plate surface 84 through the angular distance required to bring a new cutting corner on the insert to the reference position on the magazine.

Having described a preferred embodiment of my invention what I claim and desire to secure by U.S. Letters patent is:

1. A dispenser for supplying cutting tool inserts each insert having multiple cutting edges for use in machining comprising:

a magazine mounted for rotation about an axis, adapted to carry a plurality of inserts at spaced locations, the cutting edges occupying fixed positions with respect to reference positions;

a rack mounted for reciprocating movement;

a first piston reciprocating within a cylinder and connected to the rack;

clamping means drivably engaged with the rack, rotatable as the rack moves, adapted to grip and hold an insert carried on the magazine, to remove an insert from the magazine and to return the insert to the magazine as the piston moves;

a second piston within a cylinder;

a surface adapted to rotate about an axis, movable into contact with an insert carried on the magazine whereby the insert is transferred from the magazine onto the surface as the second piston moves;

means for rotating the insert with respect to its reference position while the insert is supported on the surface so that another cutting edge of the insert is brought into alignment with the reference position;

means for transferring the insert from the support surface onto the magazine;

a gear wheel fixed to the third piston drivably engaged with the rack and adapted to rotate the surface as the first piston moves; and means for incrementally advancing the position of the magazine with respect to the clamping means whereby each insert is sequentially removed from the magazine.

2. A dispenser for supplying cutting tool inserts, each insert having multiple cutting edges for use in machining comprising:

a source of pressurized fluid;

a magazine mounted for rotation about a first axis, adapted to carry multiple inserts at angularly spaced locations about the axis;

a rack mounted for reciprocating movement perpendicular to the first axis;

a first piston connected to the rack reciprocating within a first cylinder as the cylinder is pressurized from the pressure source and vented; and clamping means including clamping surfaces for engaging a tool insert carried by the magazine, the clamping means being driveably engaged with the rack and rotatable about a second axis directed perpendicular to the first axis, adapted to grip and hold an insert, to remove the engaged insert from the magazine by rotation of the clamping means about the second axis as the first piston moves within the first cylinder and to hold the insert during machining.

3. The device of claim 2 wherein the clamping surfaces of the clamping means engage the insert when the first piston is at one end of the first cylinder and the engaged insert is rotated about the second axis as the piston moves within the cylinder.

4. The device of claim 2 further comprising:
a second piston movable within a second cylinder directed parallel to the first axis, the piston being adapted to lift and remove from the magazine a tool insert carried on the magazine as the cylinder is pressurized;
means for rotatably supporting the second piston for rotation about the axis of the second piston;
a second rack that reciprocates as the first piston moves; and
a gear wheel fixed to the second piston and brought into engagement with the second rack as the second cylinder is pressurized and after the tool insert has been removed from the magazine.

5. The device of claim 4 further comprising means for returning to the magazine the insert removed from the magazine by the second piston after the second cylinder is vented.

6. The device of claim 4 wherein the second rack and gear wheel rotate the second cylinder about the axis of the second cylinder as the first piston moves within the first cylinder.

7. The device of claim 2 further comprising:
a ratchet wheel mounted for rotation about the first axis, the wheel having ratchet teeth extending outwardly therefrom;
a pawl engageable with the ratchet teeth movable tangentially with respect to the wheel;
a third cylinder whose axis is aligned with the direction of movement of the pawl;
a third piston working within the third cylinder and connected to the pawl, whereby the pawl rotates the wheel about the first axis by the angular distance at which the inserts are spaced on the magazine for each stroke of the third piston.

8. The device of claim 4 further comprising:
a ratchet wheel mounted for rotation about the first axis, the wheel having ratchet teeth extending outwardly therefrom;
a pawl engageable with the ratchet teeth movable tangentially with respect to the wheel;
a third cylinder whose axis is aligned with the direction of movement of the pawl;
a third piston working within the third cylinder and connected to the pawl, whereby the pawl rotates the wheel about the first axis by the angular distance at which the inserts are spaced on the magazine for each stroke of the third piston.

* * * * *